Feb. 10, 1925.
C. E. HUTCHINGS
PHOTOGRAPHIC CAMERA
Filed Nov. 9, 1922
1,525,741
8 Sheets-Sheet 1
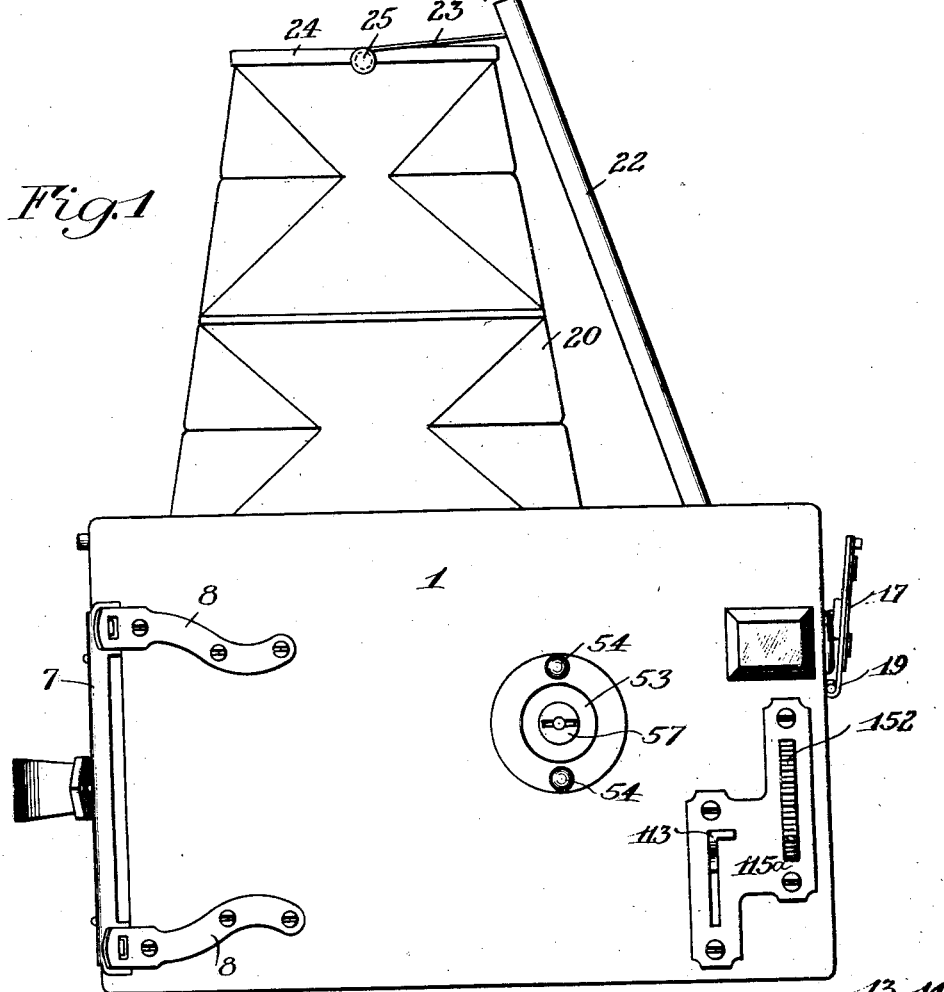
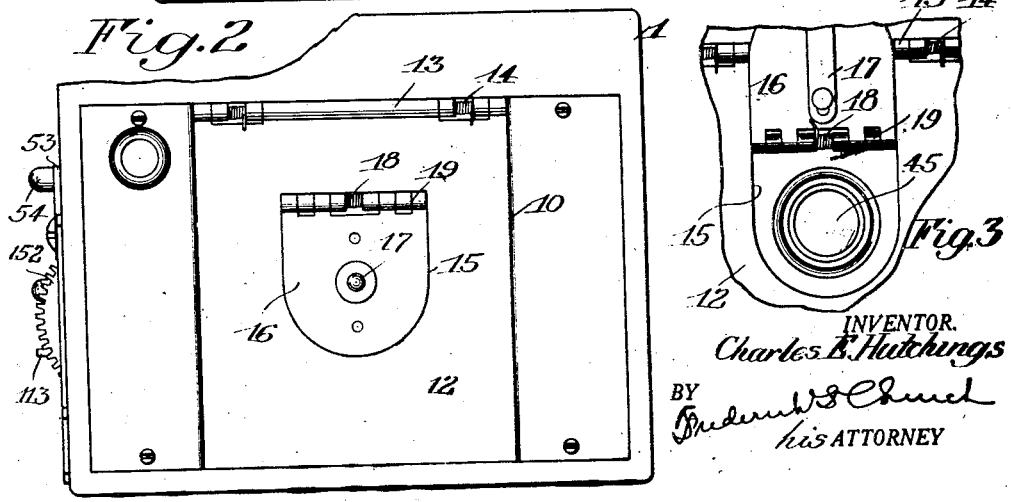
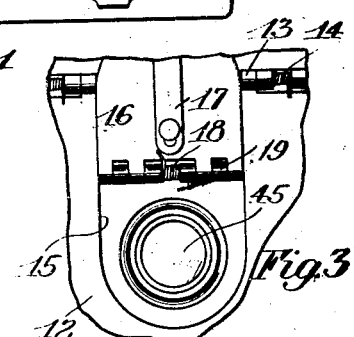
INVENTOR.
Charles E. Hutchings
BY
his ATTORNEY Feb. 10, 1925.
1,525,741
C. E. HUTCHINGS
PHOTOGRAPHIC CAMERA
Filed Nov. 9, 1922
8 Sheets-Sheet 2

INVENTOR.
Charles E. Hutchings
BY
his ATTORNEY

Feb. 10, 1925.

C. E. HUTCHINGS

PHOTOGRAPHIC CAMERA

Filed Nov. 9, 1922

INVENTOR.
Charles E. Hutchings
BY
his ATTORNEY

Feb. 10, 1925.

C. E. HUTCHINGS

PHOTOGRAPHIC CAMERA

Filed Nov. 9, 1922

INVENTOR.
Charles E. Hutchings
BY
his ATTORNEY

Feb. 10, 1925.                                                    1,525,741
C. E. HUTCHINGS
PHOTOGRAPHIC CAMERA
Filed Nov. 9, 1922                        8 Sheets-Sheet 5

INVENTOR.
Charles E. Hutchings
BY
Frederick Church
his ATTORNEY

Feb. 10, 1925.
C. E. HUTCHINGS
PHOTOGRAPHIC CAMERA
Filed Nov. 9, 1922
1,525,741
8 Sheets-Sheet 6
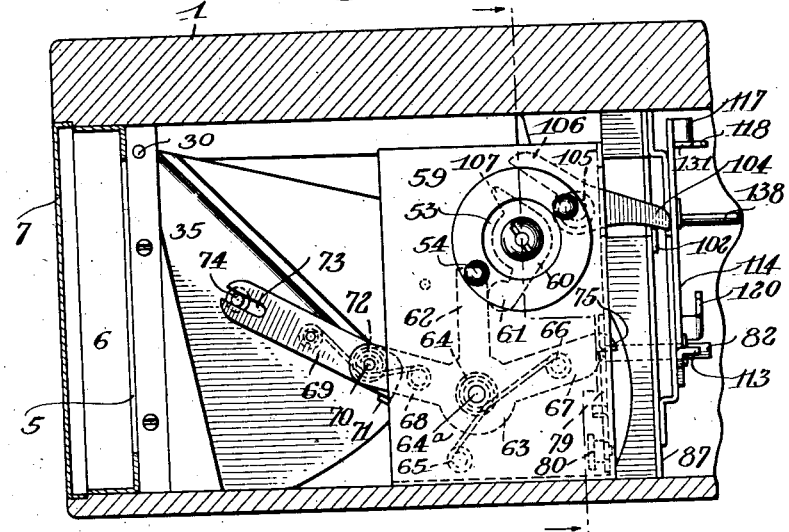
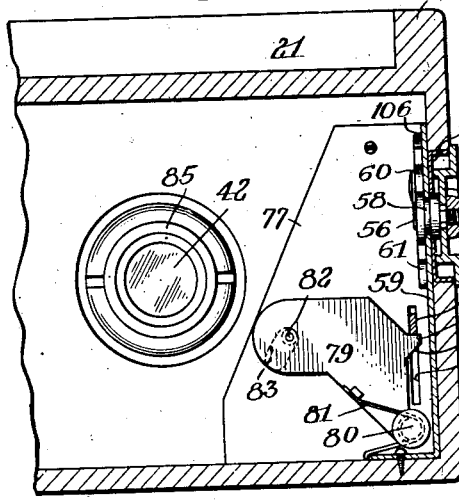
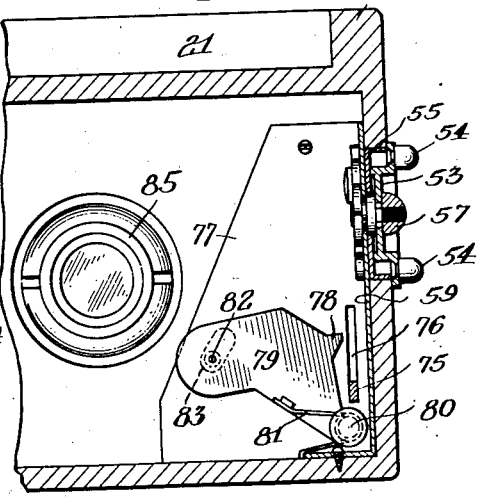
INVENTOR.
Charles E. Hutchings
BY
his ATTORNEY Feb. 10, 1925.                                                    1,525,741
C. E. HUTCHINGS
PHOTOGRAPHIC CAMERA
Filed Nov. 9, 1922                8 Sheets-Sheet 8

INVENTOR.
Charles E. Hutchings
BY
his ATTORNEY

Patented Feb. 10, 1925.

1,525,741

UNITED STATES PATENT OFFICE.

CHARLES E. HUTCHINGS, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC CAMERA.

Application filed November 9, 1922. Serial No. 599,757.

*To all whom it may concern:*

Be it known that I, CHARLES E. HUTCHINGS, a citizen of the United States, residing at Rochester, in the county of Monroe and State of New York, have invented certain new and useful Improvements in Photographic Cameras; and I do hereby declare the following to be a full, clear, and exact description of the same, reference being had to the accompanying drawing, forming a part of this specification, and to the reference numerals marked thereon.

My present invention relates to photography and more particularly to photographic cameras of the reflecting type in which the view is found through the same lens that makes the photographic exposure and the invention has for its object to provide a convenient and efficient camera of this character having safeguards preventing the sensitized material from becoming fogged from light admitted during the focusing operation; having shutter arrangements preventing double exposures on a single sensitized area and having other improvements that promote a smooth automatic performance of the various mechanism which successively operate to focus and then immediately photograph the desired view. To these and other ends the invention consists in certain improvements and combinations of parts all as will be hereinafter more fully described, the novel features being pointed out in the claims at the end of the specification.

In the drawings:

Figure 1 is a side view of a hand camera constructed in accordance with and illustrating one embodiment of my invention, the parts being shown in focusing position.

Figure 2 is a front view of the camera shown in Figure 1 but with the lens door closed.

Figure 3 is a fragmentary view of the camera front showing the lens door open.

Figure 17 is a view similar to Figure 10 and Figure 11, partly broken away and showing the mirror in set position as it appears after its operating member has been released from the hand of the operator.

Figure 18 is a fragmentary rear view of the lens wall at the front of the camera body, the view being in transverse section through the camera on the line 18—18 of Figure 17.

Figure 19 is a view similar to Figure 18 but showing the parts in another position.

Similar reference numerals throughout the several views indicate the same parts.

To first give a general idea of the performance of the camera, it is as before stated a reflecting camera having a lens at the front, a pivoted mirror inside and a focusing screen at the top surmounted by a focusing hood. Instead of the focal plane shutter sometimes used in such cameras the ordinary lens shutter is provided. When the mirror moves from its inoperative position covering the focusing screen to its operative position, connected mechanism opens the shutter to cast the image on the focusing screen. At the same time the mirror pulls down a safety curtain that intercepts light entering through the focusing screen until the mirror reaches its seat at which time the curtain is automatically released. The shutter is of the automatic type and when the view is focused and the exposure is to be made a common tripping device first closes the shutter then releases the mirror and finally again actuates the shutter to both open and close it. At the conclusion of its movement, this operating or tripping device is locked against return so that the shutter cannot be again actuated and a double exposure made until the mirror is again set which operation releases the locking means. The latter may, however, be rendered inoperative in case it is desired to make a time exposure instead of an automatic or instantaneous exposure.

Figure 4:
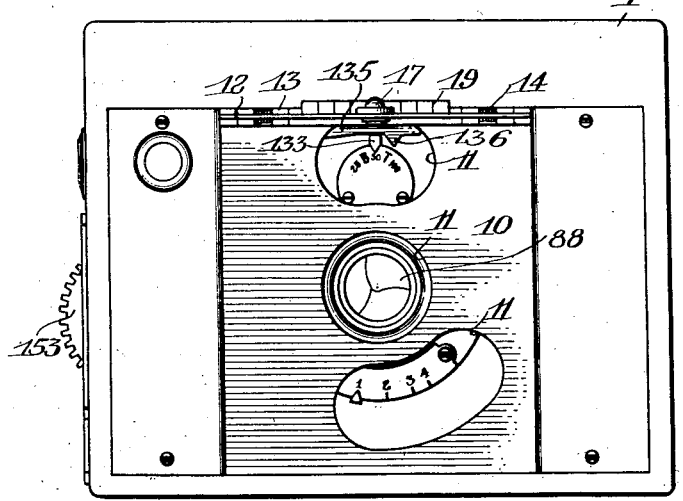
Figure 4 is a front view of the camera with the door which gives access to certain parts in the shutter chamber open.

Figures 1, 6 to 8 and 11 to 13 best show the general construction of the camera and the reflecting or mirror mechanism. The camera consists of a box or body 1 having a forward transverse partition 2 dividing it into a lens and shutter chamber 3 and an exposure and mirror chamber 4 in rear thereof. At the back is an exposure opening 5 in the focal plane, said opening being formed in the present instance in a frame 6 which, in conjunction with a hinge door 7 secured by yielding latches 8, constitutes a holder for a film pack or similar supporting means for sensitized material although it is obvious that the invention hereinafter described may be used with any kind of sensitive material. The front of the camera box is closed by a plate 9 having a depressed central portion 10 provided with openings 11 (Figure 4) through which certain portions of the shutter hereinafter described may be observed. Lying within the depression 10 is a cover 12 hinged at 13 normally held closed by springs 14. The cover in turn has a central lens opening 15 normally closed by a small door 16 provided with a sliding latch 17 that retains it in this position against the tendencies of a spring 18 on its hinge 19.

At the top of the camera box are the usual exterior focusing elements including a bellows type extensible focusing hood 20 that can be collapsed within a well 21 beneath a hinged cover 22 that supports the hood when extended through the medium of spring links 23 pivoted to the eye piece 24 at 25. The lower end of the hood surrounds a ground glass or other focusing screen 26 set into the top wall within the well 21 and covering an opening 27 through which light from the lens is projected on to the screen by the mirror.

Figure 11:
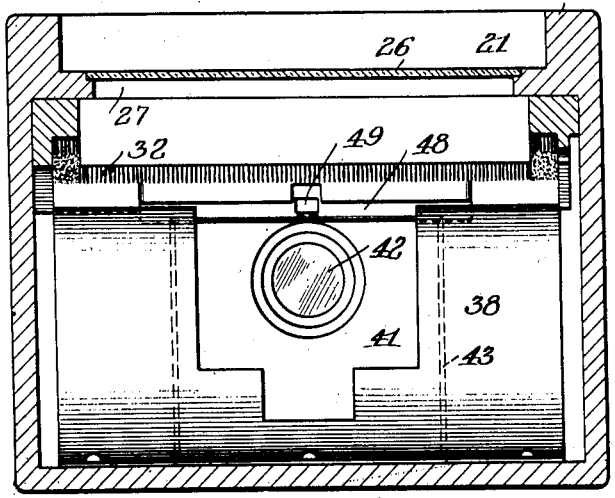
Figure 11 is a transverse vertical section through the camera body taken substantially on the line 11—11 of Figure 6 showing the light locking devices of the mirror in rear elevation.

The mirror 28 is carried on a plate 29 pivoted at 30 at the upper rear corner of the chamber 4. In its inoperative position of Figure 6 the plate 29 rests against a seat 31 surrounding the focusing opening 27 and lined with a pile fabric 32 that constitutes a light lock whereby light from the focusing screen is prevented from entering the exposure chamber. In its operative position of Figure 8 the mirror plate 29 rests in a similar manner against the similar seat 33 at the bottom of the exposure chamber. This seat includes cheek plates 34 spaced from the side walls of the chamber and behind which swing in overlapping engagement wings or side flanges 35 on the frame 29 as light excluding elements at these points. At the front the mirror frame 29 is provided with a narrower flange 36 that hooks over the edge of the seat 33 and is covered with a light sealing pile fabric 37 (Figure 12) that sweeps the arcuate surface of a rearwardly bent plate 38 secured at 39 to the front of the seat 31 and at 40 to the bottom of the camera box. In this plate 38 is cut an opening 41 in alignment with the lens 42 as shown in Figure 11. Forwardly of this opening is a box 43 (shown in dotted lines in Figure 11) for directing the light from the lens therethrough which box is itself provided with an opening 44 also in alignment with the lens.

The arcuate plate 38 at a point near the forward side of the upper mirror seat 31 is provided with curtain brackets 45 (Figure 13) in which are journalled the ends of the usual type of spring roller 46 carrying a curtain 47. The free edge of this curtain is stiffened by a binding plate 48 having an opening 49 therein. On the flanged forward edge 36 of the mirror plate 29 is a catch finger 50 and when the mirror is in the upper inoperative position of Figure 6 this finger 50 automatically engages in the opening 49 of the curtain as shown. When the mirror is drawn down for focusing it pulls the curtain with it as shown in Figure 7 and the curtain, by covering the opening 41 in the arcuate plate, prevents light entering at the focusing screen from reaching the focal plane while the mirror is in an intermediate position and before it has reached its lower position against the seat 33.

Means are provided for automatically releasing this curtain when the mirror has completed its downward movement and is in operative position. This means consists in the present instance of an offset forked plate 51 secured to the seat 33 at 52. When the mirror reaches its seat the catch finger 50 thereon passes between the bifurcations of the fork 51 which latter is curved on its under or forward side in the manner of a cam. The edge 48 of the curtain rides on this cam and is caused to slip off the end of the catch finger as shown in Figure 7 so that the curtain returns under the influence of its spring to the position of Figure 8 and is reengaged only when the mirror is returned to inoperative position.

The operating mechanism for the mirror is best shown in Figures 9, 10 and 17 to 19. It embodies a rotary setting member 53 accessible from the exterior at the side of the camera and provided with buttons 54 for manual operation. It has a bearing in a bushing 55 through which extends a stud 56 secured to the setting member by a nut 57 and having a bearing 58 in an angular mounting plate 59 on the interior of the camera and fastened to the side wall thereof. Fixed to the inner end of the stud 56 to lie against the mounting plate is a plate 60 having a downwardly extending arm 61 engaging the forward side of an upwardly extending arm 62 on a plate 63 pivoted at 64 below the setting member.

This element 63 is the device which swings the mirror upwardly to inoperative position when released for which purpose it is provided with a spring 64$^a$ coiled about its pivot with one end anchored to the plate 59 at 65 and the other end bearing at 66 upon a forwardly extending latch arm 67 that will be later referred to. A rearwardly extending arm 68 on the plate 63 has another arm 69 pivoted to it at 70 in the manner of a knee joint, a lip 71 on one engaging the other holding the two arms straight when the arm 68 is moved in an upward direction but allowing the arm 69 to articulate when the two arms are moved in a downward direction. A spring 72, however, coiled about the pivot 70 and acting against the two arms normally holds them straight as in Figure 9 and the relative upward flexing of the arm 69 is resisted by this spring.

Figure 9:
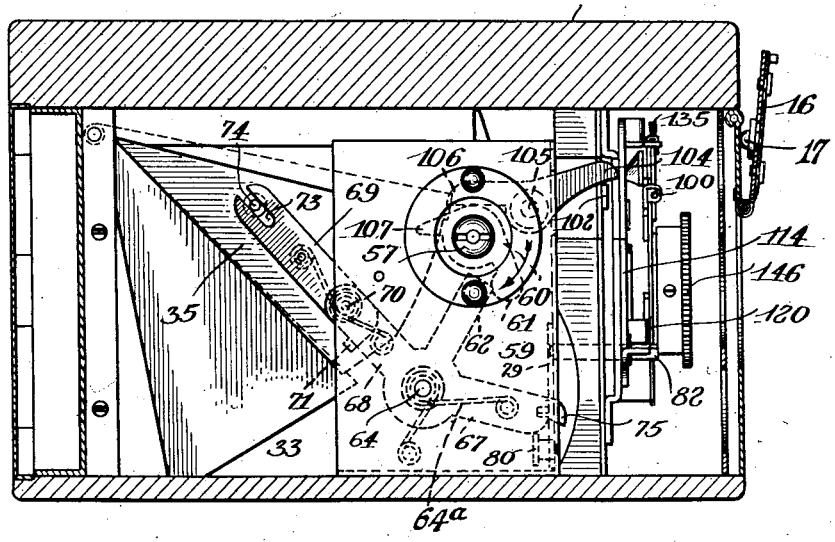
Figure 9 is a side view of the mirror operating and shutter mechanisms with the side wall removed and other parts of the body shown in vertical section, the said mechanisms being in normal positions.
Figure 10:
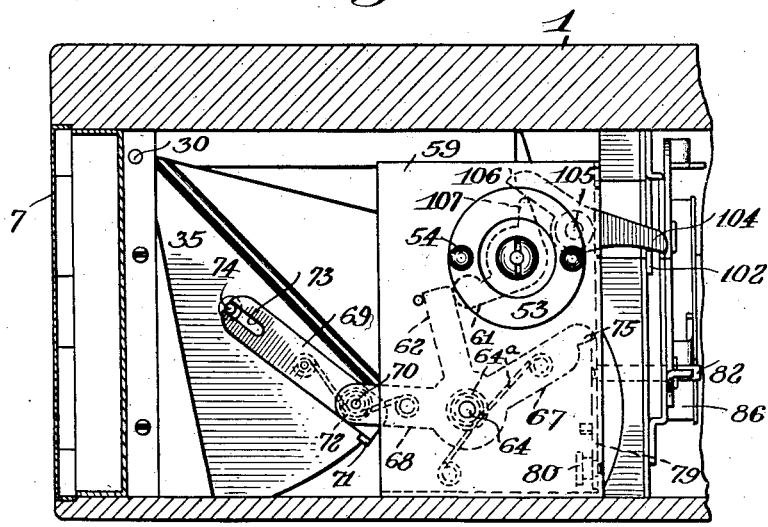
Figure 10 is a similar view partly broken away with the mirror in set or operative position.

The outer or rearward end of the extension arm 69 is bifurcated at 73 to engage a pin or stud 74 on one of the side flanges 35 of the mirror frame 29. It will thus be seen that when the spring plate 63 is released it will swing the mirror plate to its upward position from that of Figure 17 to that of Figure 9 but when the setting member 53 is turned to the right it will, through the arm 61 thereon, engaging the arm 62, rock the plate 63 to the left against the tension of its spring 64$^a$ and moves the mirror down to operative position, the spring 72 being strong enough to accomplish this. Because of other functions that the setting member must simultaneously perform the plate 63 is moved farther than is merely necessary to carry the mirror to its lower seat and the jointed yielding arms 68 and 69 are provided for the purpose of allowing lost motion on the part of the plate 63 at this point as shown in Figure 10. The movement of the setting member 53 is to the point shown in that figure but when released it returns slightly to the position of Figure 17 under the influence of the spring 72. Nevertheless, in the position of Figure 17 the arms 61 and 69 are still cocked sufficiently to allow the spring 72 to assert itself in the way of holding the mirror frame securely on its seat 33.

When the mirror is set in this manner it is retained in the position of Figure 17 and the main spring 64$^a$ is restrained by the forwardly projecting latch arm 67 before referred to. The shouldered end 75 of this latch arm operates in a vertical slot 76 (Figure 18) in a forward angular portion 77 of the mounting plate 59. A shoulder 78 on a latch plate 79 pivoted at 80 normally bridges the slot 76 under the influence of a spring 81 encircling the pivot. The spring action is limited and the position of the shoulder normally defined by a pin 82 on the latch plate engaging an end wall of a slot 83 in plate 77 which pin has another function hereinafter referred to. The latch arm 67 is normally at the bottom of the slot 76 below the shoulder 78 as shown in Figure 9 but when the mirror is set the latch arm moves to the position of Figure 10 displacing the latch plate 79 by engagement with a cam surface 84 on the under side of the shoulder 78. It then drops back and engages the shoulder 78 as shown in Figure 18 when the setting member 53 is released and the arms 68 and 69 straighten out.

Figure 6:
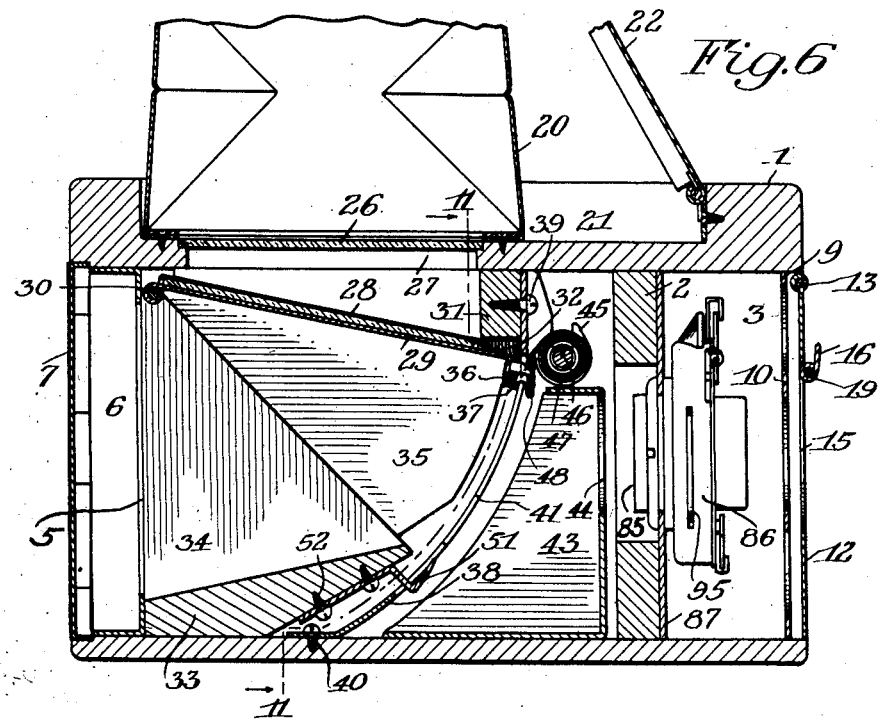
Figure 6 is a longitudinal central section through the camera with the focusing hood and the top door broken away and with the focusing mirror in inoperative position.
Figures 7, 8:
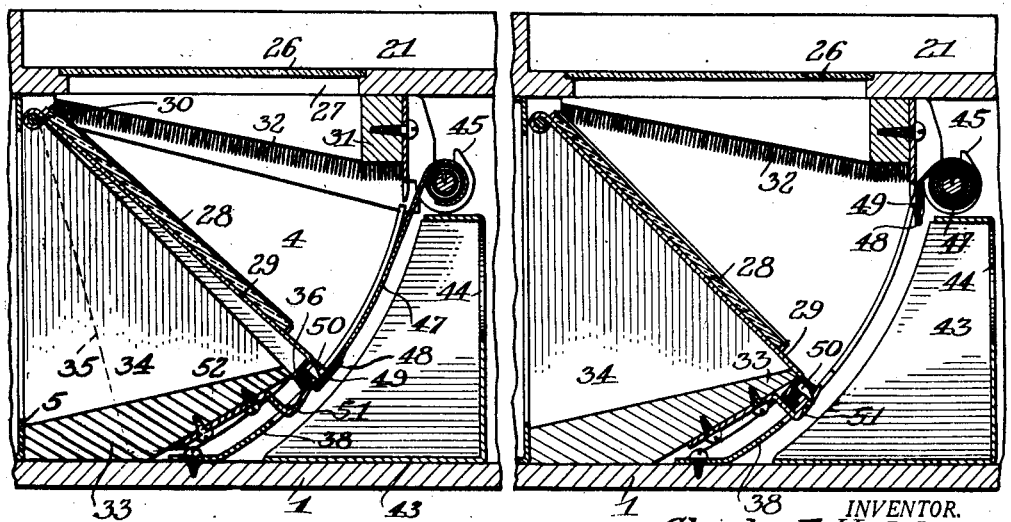
Figure 7 is a similar but fragmentary view showing the focusing mirror approaching its operative position.
Figure 8 is another similar fragmentary view showing the focusing mirror in operative position.
Figure 14:
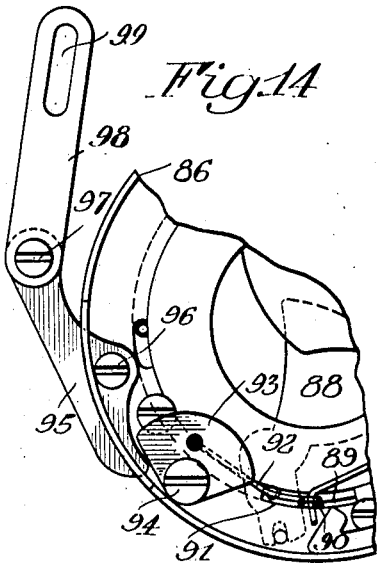
Figure 14 is an enlarged fragmentary front view of the shutter casing showing certain connecting parts between it and the mirror mechanism.
Figure 12:
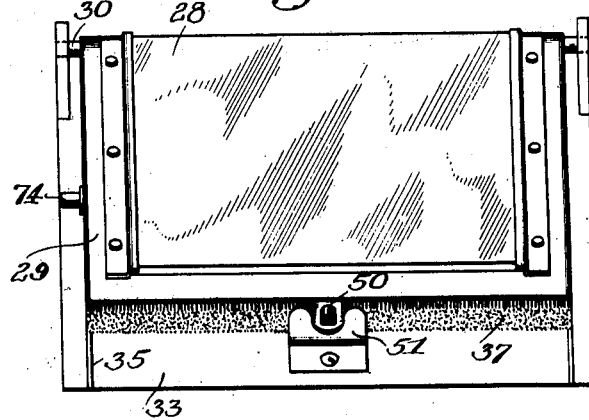
Figure 12 is an elevation of the focusing mirror, its mounting and its seat looking from the front of the camera.
Figure 15:
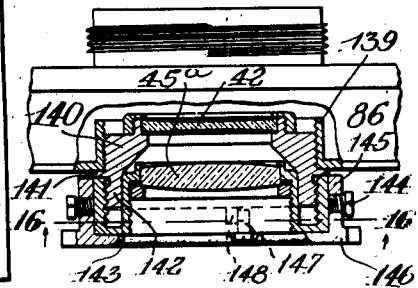
Figure 15 is a top view of the lens mount partly broken away and in horizontal section.
Figure 13:
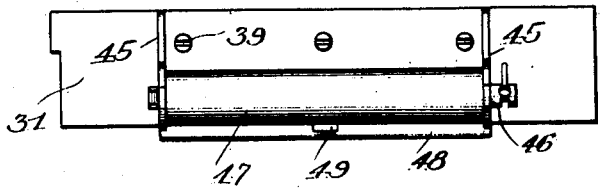
Figure 13 is a front elevation of the safety curtain for the mirror.
Figure 16:
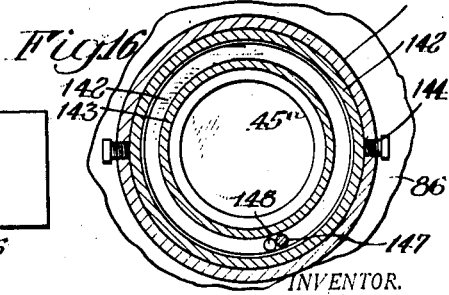
Figure 16 is a vertical section taken transversely through the lens mount on the line 16—16 of Figure 15.

Referring for a moment to Figure 15 and Figure 6 there is carried in the lens wall 2 a lens mount embodying a threaded tube 85 into which is screwed in the usual manner an automatic lens shutter 86 to occupy the chamber 3. The wall 2 is faced with a mounting plate 87 upon which the mechanism hereinafter described is largely carried. The mechanism of such a shutter is well known to those skilled in the art but I have shown enough of it in Figure 14 to illustrate a certain connection. The shutter blades 88 open and close as a shutter ring 89 is moved back and forth through the medium of an ear 90 thereon projecting through a slot 91. I connect this ear 90 by a link 92 to an oscillatory member 93 pivoted at 94 to the shutter casing. This oscillatory member is engaged by one arm of a lever 95 pivoted at 96 to the shutter casing and the other arm of which is pivoted at 97 to a link 98 having a slot 99 at its upper end. When this lever 95 is rocked to the left by downward movement of the link 98 the shutter blades are positively opened and remain open until the link 98 is drawn upwardly again but no longer. Otherwise than this the shutter is operated in the usual manner by depressing the shutter lever 100 shown in Figures 20 to 24 to which attention is now directed. If the shutter is set for time one such depression will open it and the next one will close it but if set for instantaneous the one depression thereof will both open and close it.

The shutter is held open for focusing purposes during the time the mirror is in operative position through the medium of the mechanism just described in the following manner:

Pivoted to the lens wall mounting plate 87 at 101 is a substantially horizontal shutter actuating lever 102 that is normally held raised by a spring 103 coiled about its pivot. The free end of the lever extends over to the side wall of the camera beneath a lever arm 104 pivoted to the mounting plate 59 (Figure 9) at 105. The other arm 106 of this lever rests on the setting plate 60 and the lever is adapted to be rocked by a cam arm 107 on the latter during the setting of the mirror as previously described. The resulting depression of the lever 104 depresses the shutter actuating lever 102 which is connected to the link 98 by a headed pin 108 thereon that passes through the slot 99 of said link and this opens the shutter blades for focusing while the mirror is down all with one movement of the operating member 53. When the shutter is fully opened the actuating lever 102 is engaged on a forwardly extending ear 109 thereof by a detent 110 pivoted at 111 to the plate 87 which detent holds it open and is pressed into engagement as in Figure 21 by a spring 112 coiled about the pivot.

It is now in order to describe how, after focusing the mirror is returned to inoperative position and the shutter is closed and then opened and closed for the exposure. The immediate tripping element is a hand operating member 113 (see Figure 23) projecting through a slot 114ª in the side of the camera and a plate 115ᵉ surrounding the same. This operating member is constituted by a lateral extension on a vertically reciprocatory plate 114 slotted at 115 to receive headed guide pins 116 on the plate 87. It is shown in detail in Figure 22. A forwardly offset arm 117 at the top thereof terminates in a forwardly projecting ear 118 above the shutter operating lever 100. Another forwardly offset arm 119 further down is provided with a cam or incline 120 arranged above the pin 82 on the latch plate 79 (see Figures 18 and 19). At the lower end of the sliding plate is a rounded or cam surface 121 (see Figures 20 and 21) normally resting above but adapted to engage a forwardly projecting ear 122 on the lower end 123 of the detent 110 below the pivot of the latter. The plate 114 is normally held in the raised position of Figure 20 by a spring 124 mounted on a stud 125 and engaging the plate at 126 and a stationary pin at 127.

Figure 21:
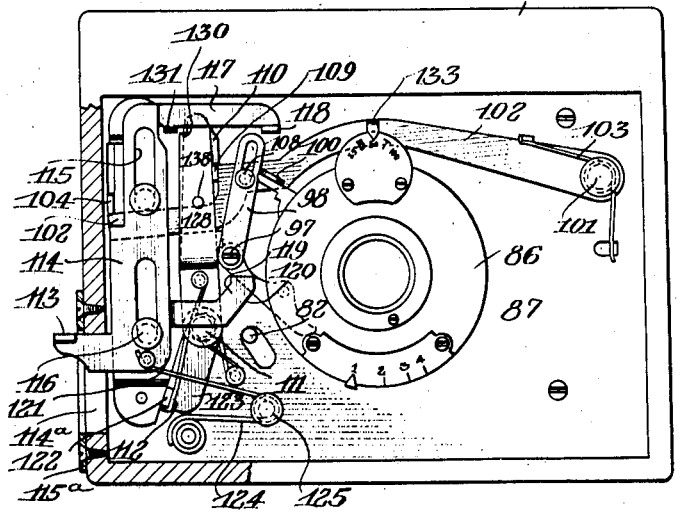
Figure 21 is a similar view showing the shutter open for focusing.
Figure 23:
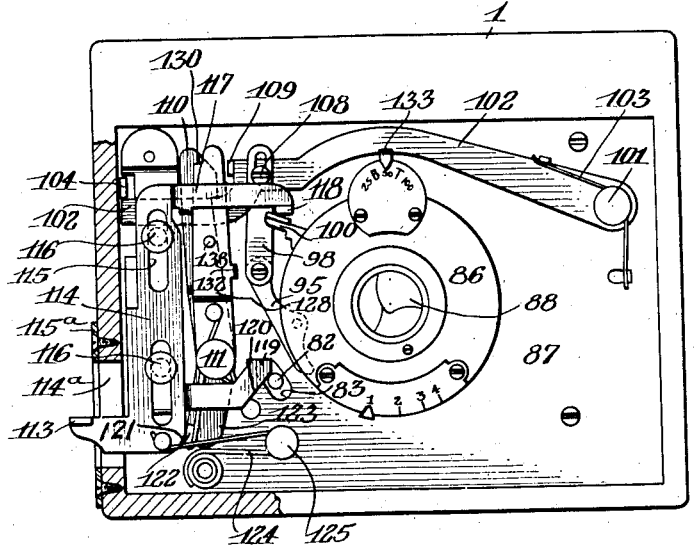
Figure 23 is a view similar to Figures 20 and 21 showing the positions of the parts when the trip has been partially operated and Figure 24 is a view similar to Figure 23 showing the parts as they appear after the trip has reached the limit of its movement.
Figure 24:
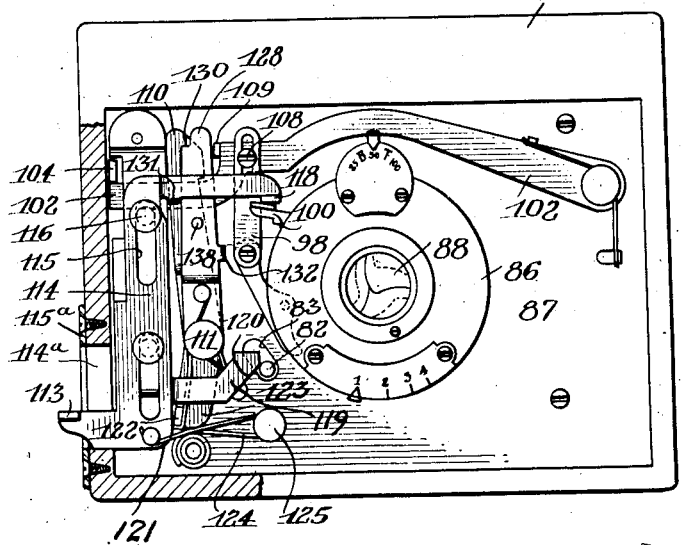

The camera being in focusing condition as in Figure 21, when the operating member or trip 113 is depressed as far as the position of Figure 23 the cam surface 121 on the sliding plate 114 first engages the detent arm at 122, releases the detent 110 and permits the shutter actuating lever 102 to rise so that the shutter will close by its own spring raising the link 98. Next, the camera being sealed at the lens, the mirror may be raised to an operative position which is effected by the cam 120 engaging and depressing the pin 82 to retract the latch plate 79 and release the latch arm 67 of the mirror actuator (see Figures 17 and 18). Finally the ear 118 reaches the shutter operating lever 100 as in Figure 23 and upon the further depression of the finger piece 113 to the position of Figure 24 the shutter is operated and opens and closes to make the exposure.

Figure 20:
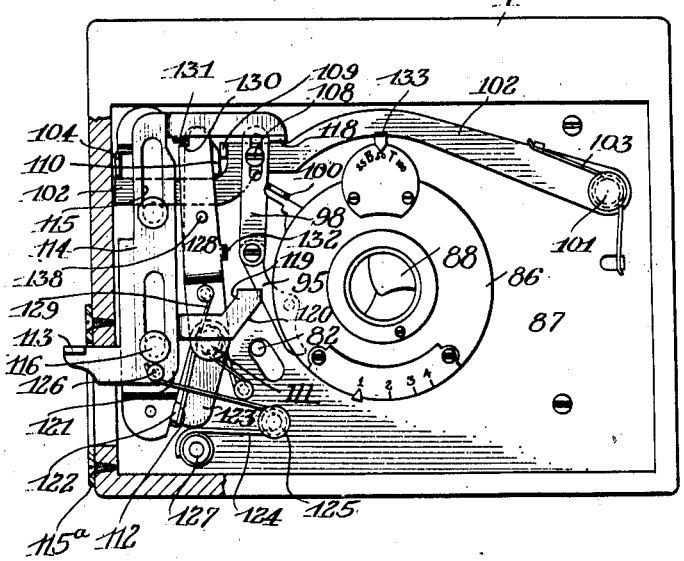
Figure 20 is a front view partly in section with the front wall of the camera body removed to show an elevation of the lens wall or rear wall of the shutter chamber and shutter controlling mechanism mounted thereon the same being in normal position.
Figure 22:
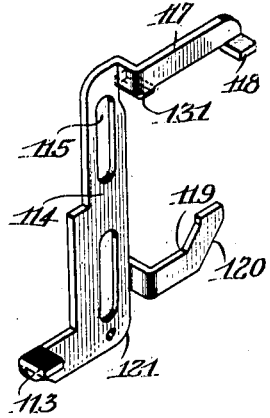
Figure 22 is a perspective view of the tripping device of the camera.

The operating member 113 is now released and returns to the position of Figure 20 under the influence of its spring 124 but it cannot be again depressed until the mirror has been again actuated to operative position for focusing another picture. This is because of a detent 128 over-lying the detent 110 and turning upon the same pivot 111 under the influence of a spring 129 that presses an engaging shoulder 130 on the detent 128 beneath a rearwardly turned ear 131 on the arm 117 of the tripping plate 114. However, the detent 128 has a rearwardly turned ear 132 on its side that interlocks it from movement in one direction with the detent 110. The spring of the detent 110 is superior to that of the detent 128 so that when the shutter actuating lever 122 is depressed by the mirror setting mechanism and allows the detent 110 to move to the right into engagement with it the said detent 110 carries the detent 128 over with it far enough to release it from the plate 114 at 131 as shown in Figure 21.

Figure 5:
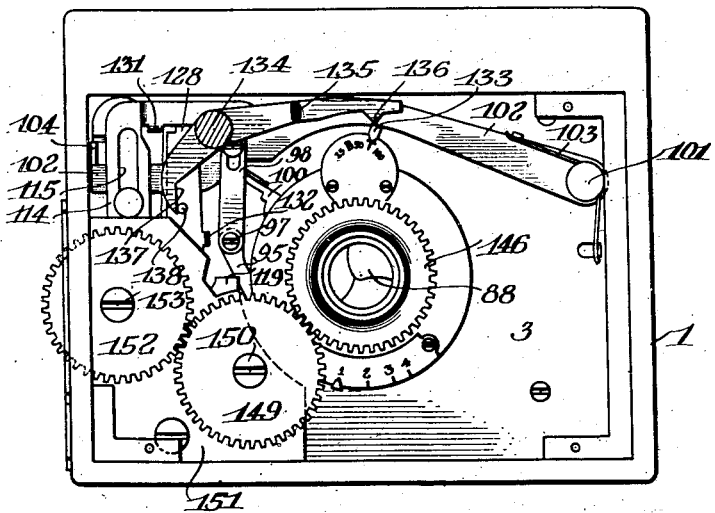
Figure 5 is a front view of the interior of the shutter chamber with the front plate removed.

In making time exposures it is of course necessary to permit recurrent actuations of the operating member 113 in order that the shutter operating lever 100 may be depressed once to open the shutter and again to close it in the usual way. I therefore provide for rendering the detent 128 inoperative, automatically, when the shutter is set for time exposure by means of the usual pointer 133 as shown in Figure 5. To this end I pivot to a stud 134 mounted on the rear of the front plate 9, a lever 135 having a cam 136 thereon. When the shutter pointer 133 is set for an instantaneous exposure as in Figure 4 the lever 135 rests thereon in a lowered position but when the said pointer is rotated to the time position as shown in Figure 5 it engages the cam 136 and rocks the lever upwardly. This causes a hook 137 at the opposite end of the lever to engage a pin 138 on the detent 128 and retract it permanently from the path of the tripping plate.

I also house within the shutter chamber 3 a focusing mechanism for the lens. Referring to Figure 15, within the shutter casing 86 is an interiorly threaded collar 139 which receives the mounting ring 140 of the lens system 44—45. The lens 44 is held stationary by screwing the mounting ring tight in the collar against a shoulder 141. A projecting portion 142 of the mounting ring is threaded to receive a sleeve 143 carrying the other movable lens 45 which is moved along the axis by rotating the sleeve. For the latter purpose there is locked thereto by set screws 144 a collar 145 on a ring gear 146. This gear and the lens collar can make but one revolution thru the cooperation of stop pins 147 and 148 on the lens collar and the fixed mounting ring 140 respectively.

The ring gear 146 (Figure 5) meshes with an intermediate gear 149 turning on a stud 150 carried by a mounting plate 151 projecting into the chamber 3 from the side wall. The intermediate gear 149 in turn meshes with a gear 152 turning on a stud 153 so that its periphery projects through a slot in the side wall of the camera and in the plate 115 from whence it becomes accessible on the exterior or turning with the thumb or finger. In this way the lens may be accurately focused with convenience through a positively acting mechanism.

I claim as my invention:

1. In a reflecting camera, the combination with a camera box, a lens and a focusing screen at one side of the body and lens, of a movable mirror having an inoperative position in which it closes off light from the screen and an operative position with reference to the lens and screen, of a shutter operated directly by the mirror for excluding from the focal plane of the camera box light admitted through the screen while the mirror is in an intermediate position.

2. In a reflecting camera, the combination with a camera box, a lens and a focusing screen at one side of the body and lens, of a movable mirror having an inoperative position in which it closes off light from the screen and an operative position with reference to the lens and screen, of a roller curtain located adjacent to the screen and engaged by the mirror to move downwardly therewith and exclude from the focal plane of the camera box light admitted through the screen while the mirror is in an intermediate position.

3. In a reflecting camera, the combination with a camera box, a lens, and a focusing screen at one side of the body and lens, of a swinging mirror having an inoperative position in which it closes off light from the screen and an operative position with reference to the lens and screen, of a curtain operated by engagement of the free edge of the mirror therewith for excluding from the focal plane of the camera box light admitted through the screen while the mirror is in an intermediate position.

4. In a reflecting camera, the combination with a camera box, a lens, and a focusing screen at one side of the body and lens, of a swinging mirror having an inoperative position in which it closes off light from the screen and an operative position with reference to the lens and screen, of a curtain operated by engagement of the free edge of the mirror therewith for excluding from the focal plane of the camera box light admitted through the screen while the mirror is in an intermediate position, and means for automatically releasing the curtain from the mirror when the latter has reached its operative position.

5. In a reflecting camera, the combination with a camera box, a lens, and a focusing screen at one side of the body and lens, of a swinging mirror having an inoperative position in which it closes off light from the screen and an operative position with reference to the lens and screen, of a spring roll curtain located adjacent to the screen, means on the free edge of the mirror adapted to automatically engage the curtain when the mirror is in inoperative position and to draw it down to exclude from the focal plane of the camera box light admitted through the screen while the mirror is in an intermediate position, and a cam device for automatically releasing the curtain from said engaging means when the mirror has reached its operative position.

6. In a reflecting camera, the combination with a camera box, a lens and a focusing screen at one side of the body and lens, of a movable mirror having an inoperative position in which it closes off light from the screen and an operative position with reference to the lens and screen, of a curtain for excluding from the focal plane of the camera box light admitted through the screen while the mirror is in an intermediate position, means on the latter directly engaging the curtain when the mirror is in other than its operative position and a device for automatically releasing said means when the mirror reaches its operative position.

7. In a reflecting camera, the combination with a camera box, a lens, a focusing screen at one side of the lens and box, and a swinging mirror within the latter having an inoperative position in which it closes off light from the screen and an operative position with reference to the lens and screen, of mirror operating mechanism embodying an oscillatory spring actuated member having an arm pivoted thereto and engaging the mirror, said arm being provided with a spring through the medium of which the oscillatory member communicates motion to the mirror in moving the same to operative position, and the member and arm being adapted to rigidly interlock to move the mirror to inoperative position.

8. In a reflecting camera, the combination with a camera box, a lens, a focusing screen at one side of the lens and box, and a swinging mirror within the latter having an inoperative position in which it closes off light from the screen and an operative position with reference to the lens and screen, of mirror operating mechanism embodying an oscillatory spring actuated member having one arm extending in one direction and connected to the mirror and a second arm extending in the opposite direction, a latch adapted to cooperate with said last mentioned arm, a shutter for the lens and an operating member for successively releasing the latch and the shutter.

9. In a reflecting camera, the combination with a camera box, a lens, a focusing screen at one side of the lens and box, and a swinging mirror within the latter having an inoperative position in which it closes off light from the screen and an operative position with reference to the lens and screen, of mirror operating mechanism embodying a rotary setting device, a spring pressed actuating member actuated thereby and connected to the mirror, a shutter for the lens on a front wall of the camera box, an actuating lever for the shutter also mounted on said wall, and a relatively transversely arranged pivoted lever actuated by the setting device and cooperating with the shutter actuating lever.

10. In a reflecting camera, the combination with a camera box, a lens, a focusing screen at one side of the lens and box, and a swinging mirror within the latter having an inoperative position in which it closes off light from the screen and an operative position with reference to the lens and screen, of mirror operating mechanism embodying a spring pressed actuating member, a latch for holding the latter with the mirror in operative position, a shutter for the lens, an actuator for the shutter connected to the mirror operating mechanism and adapted to hold the shutter open while the mirror is operative, a detent for the shutter actuator and an operating device arranged to successively release the shutter actuator detent to close the shutter, release the latch and operate the shutter to open and close the same.

11. In a reflecting camera, the combination with a camera box, a lens, a focusing screen at one side of the lens and box, and a swinging mirror within the latter having an inoperative position in which it closes off light from the screen and an operative position with reference to the lens and screen, of mirror operating mechanism embodying a spring pressed actuating member, a latch for holding the latter with the mirror in operative position, a shutter for the lens mounted on a front wall of the camera, an actuating lever for the shutter also mounted on said wall connected to the mirror operating mechanism and having a lost motion connection with the shutter to hold the latter open while the mirror is operative, a detent for the shutter actuator, and a reciprocatory operating device on said front wall of the camera box adapted to successively release the shutter actuator detent to close the shutter, release the catch, and directly operate the shutter to open and close the same.

12. In a reflecting camera, the combination with a camera box, a lens, a focusing screen at one side of the lens and box, and a swinging mirror within the latter having an inoperative position in which it closes off light from the screen and an operative position with reference to the lens and screen, of mirror operating mechanism embodying a spring pressed actuating member, a latch on the front wall of the camera box for holding the latter with the mirror in operative position, a shutter for the lens mounted on said wall, and a reciprocatory operating slide also mounted on said wall and adapted to successively release the latch and to directly engage and operate the shutter to open and close the same for an exposure.

13. In a reflecting camera, the combination with a camera box, a lens mounted on a front wall thereof, a focusing screen in the top wall, and a swinging mirror within the box having an inoperative position in which it closes off light from the screen and an operative position with reference to the lens and screen, of mirror operating mechanism embodying an oscillatory spring actuated member mounted on a side wall of the box and connected to the mirror and having a locking arm projecting toward said front wall, a latch on the latter cooperating with said arm to hold the mirror operative, a shutter on said front wall, an actuating lever on said front wall itself actuated by the mirror operating mechanism and having a lost motion connection with the shutter to open the same, a detent for the shutter actuating lever, and reciprocatory operating member slidable on said front wall to successively release the detent, release the mirror latch and operate the shutter.

14. In a reflecting camera, the combination with a camera box provided with a focusing screen and a lens, a mirror within the box having an inoperative position closing off light from the lens and an operative position relatively to the mirror and lens, of a shutter for the latter having a time setting device operating mechanism for the mirror embodying spring means for actuating the same to inoperative position, an operating member adapted to successively release the said spring means and operate the shutter and a detent for said operating means released by the mirror operating mechanism, and controlled by the time setting device of the shutter.

15. In a reflecting camera, the combination with a camera box provided with a focusing screen and a lens and having a lens chamber at the front thereof in which the lens is located, a focusing mirror within the box and a lens shutter mounted on the rear wall of the lens chamber and having a movable time setting device of operating mechanism for the mirror embodying spring means for actuating the same to inoperative position, an operating member adapted to successively release the said spring means and operate the shutter, a detent for said operating means released by the mirror operating mechanism, and a controlling member for the detent mounted on the front wall of the lens chamber and actuated by the time setting device of the shutter.

CHARLES E. HUTCHINGS.